United States Patent
Hayashi et al.

(10) Patent No.: US 9,838,568 B2
(45) Date of Patent: Dec. 5, 2017

(54) IMAGE READING APPARATUS AND IMAGE FORMING SYSTEM

(71) Applicant: KONICA MINOLTA, INC., Chiyoda-ku, Tokyo (JP)

(72) Inventors: Kenichi Hayashi, Hino (JP); Hiroyuki Futami, Hachioji (JP); Katsunori Takahashi, Hachioji (JP); Takashi Nara, Kawagoe (JP); Tatsuhiro Noutomi, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/051,113

(22) Filed: Feb. 23, 2016

(65) Prior Publication Data
US 2016/0269598 A1  Sep. 15, 2016

(30) Foreign Application Priority Data
Mar. 9, 2015  (JP) ................. 2015-045532

(51) Int. Cl.
H04N 1/04 (2006.01)
H04N 1/60 (2006.01)
H04N 1/00 (2006.01)

(52) U.S. Cl.
CPC ....... *H04N 1/6036* (2013.01); *H04N 1/00005* (2013.01); *H04N 1/00018* (2013.01);
(Continued)

(58) Field of Classification Search
CPC ............... H04N 1/6036; H04N 1/6044; H04N 1/00005; H04N 1/00018; H04N 1/00023
(Continued)

(56) References Cited

U.S. PATENT DOCUMENTS

| 2003/0001918 A1* | 1/2003 | Tsuchiya | B41J 29/393 347/19 |
| 2005/0151974 A1* | 7/2005 | Butterfield | H04N 1/00058 356/448 |
| 2005/0206982 A1 | 9/2005 | Hattori | |

FOREIGN PATENT DOCUMENTS

| JP | 2003-131466 A | 5/2003 | |
| JP | 2005-260305 * | 9/2005 | ............... H04N 1/46 |
| JP | 2015-15512 A | 1/2015 | |

OTHER PUBLICATIONS

Office Action (Rejection Notice) dated Mar. 14, 2017, by the Japanese Patent Office in Japanese Patent Application No. 2015-045532, and an English Translation of the Office Action. (13 pages).

* cited by examiner

*Primary Examiner* — Houshang Safaipour
(74) *Attorney, Agent, or Firm* — Buchanan Ingersoll & Rooney PC (57) ABSTRACT

An image reading apparatus and an image forming system are provided which can reduce the influence of magnification error, detect patches in correct positions, and save the sheets required for adjusting an image. The image reading apparatus makes use of an image scanner which reads patches printed on a sheet P, a spectral colorimeter which colorimetrically measures the patches read by the image scanner, and is provided with a timing compensation unit which compensates the colorimetric measurement timing with which colorimetric operation of the spectral colorimeter is triggered based on the positional information of the patches read by the image scanner, and an image correction unit which corrects the color information of the patches read by the image scanner based on the colorimetric values of the patches colorimetrically measured by the spectral colorimeter.

16 Claims, 4 Drawing Sheets

(52) U.S. Cl.
CPC ..... *H04N 1/00023* (2013.01); *H04N 1/00034* (2013.01); *H04N 1/00045* (2013.01); *H04N 1/00058* (2013.01); *H04N 1/00087* (2013.01); *H04N 1/6044* (2013.01)

(58) Field of Classification Search
USPC ........................................ 358/518, 504, 474
See application file for complete search history.

FIG. 6

IMAGE READING APPARATUS AND IMAGE FORMING SYSTEM

CROSS-REFERENCE TO RELATED APPLICATIONS

The present application claims priority under 35 U.S.C. §119 to Japanese Patent Application No. 2015-045532, filed Mar. 9, 2015. The contents of this application are herein incorporated by reference in their entirety.

BACKGROUND OF THE INVENTION

Field of Invention

The present invention relates to an image reading apparatus and an image forming system.

Description of Related Art

Heretofore, electrophotographic image forming apparatuses are known as multi-function printer (MFP) which incorporates the functionality of multiple devices such as printers, copying machines and so forth. This type of image forming apparatus performs calibration to adjust characteristics of the image forming apparatus for the purpose of realizing optimal color reproducibility. The calibration is a process of updating the gradation characteristics including densities and the like of respective colors, i.e., C (cyan), M (magenta), Y (yellow) and K (black).

When performing calibration, a plurality of patches having different densities are used. The patch is an image which is formed on a sheet for use in measuring and correcting colors and optically read by a density detecting sensor.

Also, the data obtained by optically reading the patch is compared with the image data which is used for forming the patch, and if there are differences therebetween, printing densities or the like are corrected. The quality of the output image is improved in this manner. It is believed that the size of such a patch is preferably as small as possible in the conveying direction of a sheet for the purpose of reducing a sheet for use in calibration.

The timing of acquiring such a patch is determined by detecting the leading edge of a sheet with a sheet detection sensor, and determining the position of the patch at a predetermined timer interval, and thereby the leading edge of the sheet is used as a reference position. When the leading edge of the sheet is used as a reference position in this manner, the printing position of a patch is affected by the start position of printing and magnification error in the conveying direction of the sheet, and therefore the patch may not be detected in the accurate printing position. The size of the patch is expanded for avoiding such a situation.

Also, in some cases, a positioning image is printed near the leading end of a sheet in the conveying direction; a misalignment confirming image is printed near the tail end of the sheet in the conveying direction; and a patch is printed between the positioning image and the misalignment confirming image. The density detecting sensor reads a patch with reference to the positioning image, and compensates conveyance error with reference to the misalignment confirming image (for example, refer to Japanese Patent Published Application No. 2003-131466).

In accordance with the technique described in Japanese Patent Published Application No. 2003-131466, since the reference position of a sheet is detected without using a sheet detection sensor, there is no error caused by the installation alignment of the sheet detection sensor. Also, in accordance with the technique described in this publication, since conveyance error is compensated, the detection position is prevented from being displaced with time.

However, in accordance with the technique described in this publication, a patch cannot be detected in a correct position if the printing magnification varies. Furthermore, in accordance with the technique described in this publication, since a long patch array is needed in the conveying direction of a sheet, the sheet required for adjusting an image cannot be saved.

In other words, in accordance with the technique described in this publication, it is impossible to save sheets required for adjusting an image while reducing the influence of magnification error and detecting patches in correct positions.

The present invention is made in order to solve such a prior art problem and used to provide an image reading apparatus and an image forming system which can reduce the influence of magnification error, detect patches in correct positions, and save the sheets required for adjusting an image.

SUMMARY OF THE INVENTION

To achieve at least one of the above-mentioned objects, reflecting one aspect of the present invention, an image reading apparatus utilizes an image scanner which reads a patch printed on a sheet and a spectral colorimeter which colorimetrically measures the patch read by the image scanner, and the image reading apparatus comprises: a timing compensation unit structured to compensate a colorimetric measurement timing with which colorimetric operation of the spectral colorimeter is triggered based on positional information of the patch read by the image scanner; and an image correction unit structured to correct color information of the patches read by the image scanner based on the colorimetric values of the patches colorimetrically measured by the spectral colorimeter.

Also, in accordance with the image reading apparatus of the present invention, it is preferred that the spectral colorimeter is located in the downstream side of the image scanner.

Furthermore, in accordance with the image reading apparatus of the present invention, it is preferred that a plurality of patches are printed respectively as the patch to be read by the image scanner, and that the timing compensation unit obtains intervals of the patches read by the image scanner based on the positional information of the patches read by the image scanner.

Still further, in accordance with the image reading apparatus of the present invention, it is preferred that the image correction unit associates the colorimetric values of the patches colorimetrically measured by the spectral colorimeter with the color information of the patches read by the image scanner.

Still further, in accordance with the image reading apparatus of the present invention, it is preferred that the timing compensation unit obtains intervals of the patches based on the front end position of the patches and the rear end position of the patches.

Still further, in accordance with the image reading apparatus of the present invention, it is preferred that the patch is printed on a plurality of sheets which are successively conveyed one after another, and the density of the patch printed on a first sheet of the plurality of sheets is equivalent to the density of the patch printed on a second sheet which is subsequently conveyed after the first sheet, and that the timing compensation unit compensates the colorimetric measurement timing of the first sheet or the colorimetric measurement timing of the second sheet.

Still further, in accordance with the image reading apparatus of the present invention, it is preferred that the image reading apparatus further comprises a size modification unit structured to modify the size of the patch, and that when the size modification unit modifies the size of the patch of the first sheet to a second size which is larger than a predetermined first size, and sets the size of the patch of the second sheet to the first size, the colorimetric measurement timing of the second sheet is compensated.

Still further, in accordance with the image reading apparatus of the present invention, it is preferred that the image reading apparatus further comprises a re-reading determination unit structured to determine whether to have the image scanner read the same image again, and that when the size of the patch of the first sheet is a predetermined first size and a colorimetric value of the patch is not included in a predetermined range, the re-reading determination unit determines that the image scanner is to read the patch of the first sheet again, and the colorimetric measurement timing of the second sheet is compensated.

Still further, in accordance with the image reading apparatus of the present invention, it is preferred that the timing compensation unit compensates the colorimetric measurement timing of the second sheet based on the positional information of the patch of the first sheet, and that the image correction unit corrects the color information of the patch of the second sheet based on the colorimetric values of the patch of the second sheet.

DETAILED DESCRIPTION OF THE PREFERRED EMBODIMENT

In what follows, an embodiment of the present invention will be explained with reference to drawings. However, the present invention is not limited to the following embodiment.

Figure 1:
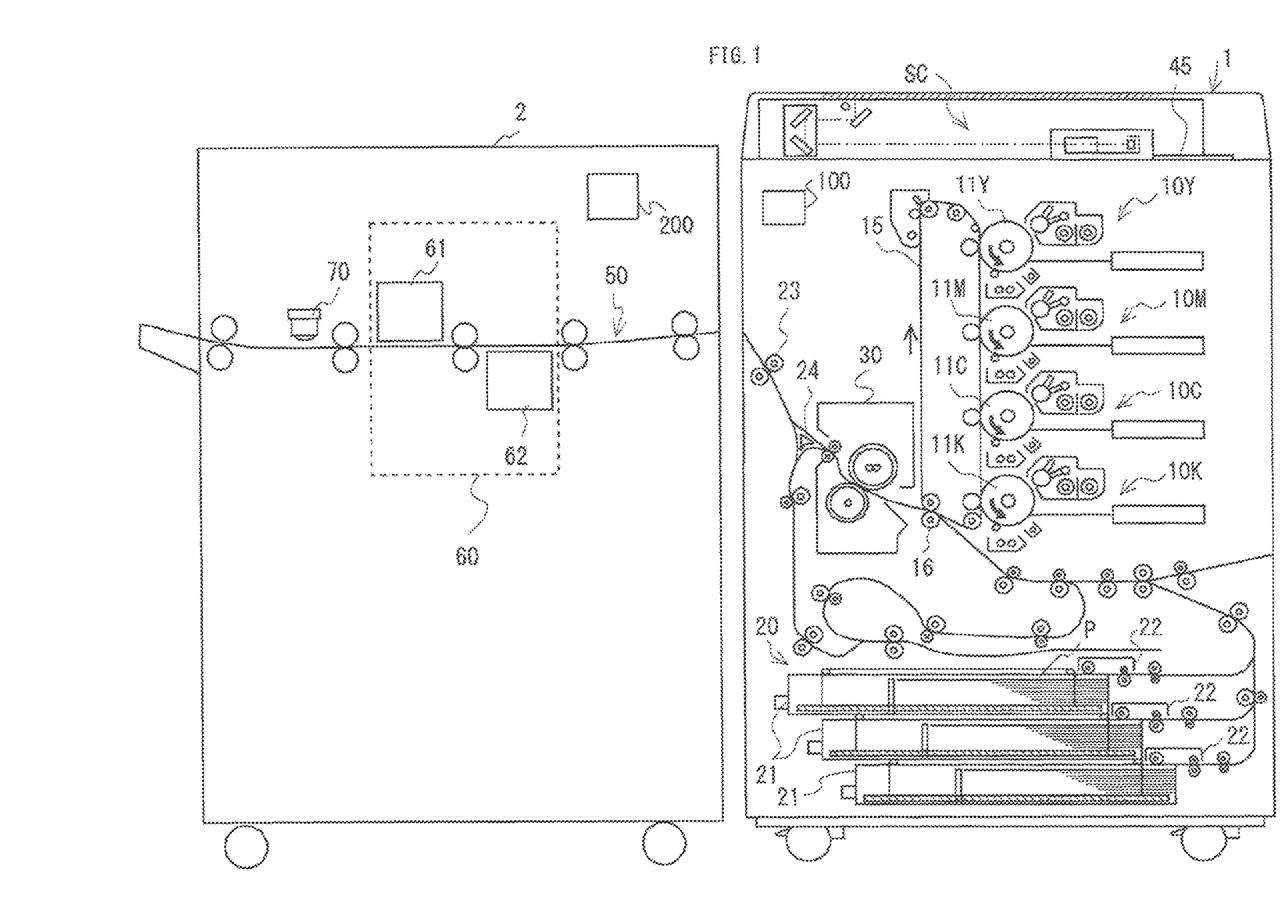
FIG. 1 is a view for schematically showing the configuration of an image forming system in accordance with an embodiment.

FIG. 1 is a view for schematically showing the configuration of an image forming system in accordance with the present embodiment. The image forming system is provided with an image forming apparatus 1 and an image reading apparatus 2. The image forming apparatus 1 is provided with a control unit 100. The image reading apparatus 2 is provided with a control unit 200.

The image forming apparatus 1 forms images, for example, by an electrophotographic system, as a so-called tandem color image forming apparatus which includes a plurality of photoreceptor drums 11Y, 11M, 11C and 11K vertically arranged in contact with one intermediate transfer belt 15 to form full-color images. The image forming apparatus 1 consists mainly of an original reading units SC and 4, four image forming units 10Y, 10M, 10C and 10K, and a fixing unit 30.

The original reading unit SC scans and exposes the image of an original with an optical system of a scanning exposing device, and reads the reflected light therefrom with a line image sensor to obtain image signals. The image signals are processed by performing A/D conversion, shading compensation, data compression and so on, and input to the control unit 100 as read data of images. Incidentally, the image data input to the control unit 100 is not limited to the image data as captured by the original reading unit SC, but can be the data for example as received from another image forming apparatus, a personal computer or the like connected to the image forming apparatus 1, or stored in a portable recording medium such as a semiconductor memory.

These four image forming units 10Y, 10M, 10C and 10K are an image forming unit 10Y for forming yellow (Y) images, an image forming unit 10M for forming magenta (M) images, an image forming unit 10C for forming cyan (C) images, and an image forming unit 10K for forming black (K) images. The image forming units 10Y, 10M, 10C and 10K consist of photoreceptor drums 11Y, 11M, 11C and 11K respectively, each of which is provided therearound with a charging unit, an optical writing unit, a development apparatus and a drum cleaner.

The surfaces of the photoreceptor drums 11Y, 11M, 11C and 11K are uniformly charged with electricity by the charging units, and the optical writing units perform a scanning exposure process to form latent images. The development apparatuses then make visible the latent images on the photoreceptor drums 11Y, 11M, 11C and 11K respectively by developing the images with toners. Predetermined color images (toner images) are thereby formed on the photoreceptor drums 11Y, 11M, 11C and 11K respectively corresponding to yellow, magenta, cyan and black. The toner images formed on the photoreceptor drums 11Y, 11M, 11C and 11K are transferred to a predetermined location of an intermediate transfer belt 15 through first transfer rollers.

After transferred to the intermediate transfer belt 15, the toner images are transferred by a second transfer roller 16 to a sheet P which is conveyed with a predetermined timing by a paper feed unit 20 to be described below. The second transfer roller 16 is located in contact with the intermediate transfer belt 15 under pressure to form a nip portion therebetween.

The paper conveying unit 20 conveys sheets P which are fed from a paper feed unit 21 along a conveying route. In the paper feed unit 21, sheets P are stored in paper feed trays, extracted from the paper feed trays by paper feeding devices 22 and transferred to the conveyance route by paper feed units 22. There are a plurality of paper conveyance units in the conveying route for conveying sheets P. Each conveyance unit consists of a pair of rollers which are urged against each other. At least one of the pair of rollers is rotated by a drive mechanism consisting of an electric motor. Meanwhile, in place of a pair of rollers, any other appropriate combination such as a combination of belts, a combination of a belt and a roller or the like combination can be generally used as a pair of rotary members serving as a conveyance unit.

The fixing unit 30 is an apparatus which performs a fixing process for a sheet P to which an image has been transferred.

The fixing unit 30 consists, for example, of a pair of fixing rollers urged against each other to form a fixing nip portion therebetween, and a heater for heating one or both of the fixing rollers. This fixing unit 30 fixes an image to a sheet P under the pressure applied between the pair of fixing rollers and the heat applied through the fixing rollers. After the fixing unit 30 processes the sheet P by the fixing treatment, the sheet P is discharged outwards by discharging rollers 23.

In the case where an image is to be formed also on the back side of a sheet P, the sheet P with the image formed on the front side is conveyed to a refeed conveying route through a switching gate 24. The refeed conveying route includes reversing rollers which hold the tail end of the conveyed sheet P and then sends back the sheet P to reverse the front and back sides of the sheet P. After reversing the front and back sides, the sheet P is conveyed by a plurality of conveyance rollers and joined with a conveying route in the upstream side of the transfer site for the purpose of supplying the sheet P to form an image on the other side.

The operation panel 45 is an input unit in the form of a touch panel through which information can be input in accordance with information displayed on a display which is not shown in the figure. A user can set a variety of parameters such as information about sheet P, i.e., the density and reduce/enlarge ratio of images and selection of a paper tray to be used as a paper supply source by operating the operation panel 45. These settings are acquired by the control unit 100. Also, the operation panel 45 is controlled by the control unit 100 and functions also as a display unit through which the user can be informed of various items of information for reference.

The control unit 100 controls the operation of the image forming apparatus 1. The control unit 100 is implemented with a microcomputer which consists mainly of a CPU, a ROM, a RAM, and an I/O interface. The control unit 100 controls the image forming operation of the image forming apparatus 1. The control unit 100 may control the image detection operation of the image reading apparatus 2.

The image reading apparatus 2 is located in the downstream side of the image forming apparatus 1. In addition to the control unit 200, the image reading apparatus 2 is provided with a paper conveying unit 50, an image scanner 61, an image scanner 62 and a spectral colorimeter 70. The paper conveying unit 50 includes a conveying route for conveying a sheet P fed from the image forming apparatus 1, and discharging the sheet P outwards.

For example, after receiving a sheet P supplied from the image forming apparatus 1, the image reading apparatus 2 detects the image formed on the sheet P. The detection result of the image is output to the control unit 200 of the image reading apparatus 2. As discussed below, the control unit 200 performs various types of processing based on the detection result of the image. Also, the control unit 200 is capable of communicating the control unit 100 of the image forming apparatus 1 to exchange various data.

The image scanners 61 and 62 are located to face a sheet P, which is conveyed on the conveying route, and read the images formed on a sheet P. The image scanner 61 scans the front side of a sheet P and is used to read an image printed on the sheet P, i.e., patches 300. The image scanner 62 scans the back side of a sheet P and is used, for example, to check misalignment between images printed on the front and back sides of the sheet P, and the existence of an extraordinary image or the like. Incidentally, the image scanner 61 and the image scanner 62 are referred to simply as the image scanner 60 when they need not be distinguished.

The image scanner 60 consists of a light source for irradiating a sheet P which is passed through a reading position, and a line image sensor consisting of a plurality of imaging devices which are linearly arranged in the sheet width direction to photoelectrically convert light reflected from the sheet P in correspondence with picture elements respectively. The reading area of the image scanner 60 is determined to cover the maximum width of sheets P which can be transferred from the image forming apparatus 1. The image scanner 60 reads the image formed on a sheet as a two-dimensional image P by repeating operation of reading image data from one line along the sheet width direction in synchronization with the operation of conveying the sheet P which is passed through the reading position. The image, which is read, is generated as read image data and output to the control unit 200 or the control unit 100.

Namely, the image scanner 60 can acquire an image of the whole surface of a sheet P by reading each line corresponding to the lateral width of the sheet P in the conveying direction of the sheet P.

Specifically, the imaging device consists of CCDs (Charge Coupled Devices). The CCDs serve as an optical sensor which reads an image on a sheet P in a reading position, and arranged in a line to be capable of reading the entire width of the sheet P as a color line sensor. On the other hand, when actually performing read operation, the imaging device operates in cooperation with an optical system and an LED (Light Emitting Diode) light source which are not shown in the figure. The optical system serves to lead an image in a reading position to the CCDs, and is provided with a plurality of mirrors and a plurality of lenses.

The spectral colorimeter 70 is arranged to face a sheet P conveyed on a conveying route in the downstream side of the image scanner 60. The spectral colorimeter 70 serves to colorimetrically measure patches 300 as described below.

Specifically, the spectral colorimeter 70 irradiates the patches 300 with a visible light source, acquires an optical spectrum of light emitted from the visible light source and reflected from the patches 300, followed by performing operations in a predetermined color model to derive the color tones of the patches 300. The spectral colorimeter 70 acquires light emitted from an ultraviolet light source and reflected from the patches 300 followed by performing predetermined operations for the purpose of eliminating the influence of fluorescence materials of the sheet P and approaching correct colorimetric values.

The colorimetric range, i.e., the viewing angle of the spectral colorimeter 70 is narrower than the reading area of the image scanner 60, and determined to be narrower than the width of the patches 300 in the sheet width direction. Specifically, a lens section which receives the light reflected from the patches 300 has, for example, a diameter of about 4 mm. In this case, for one spectral colorimeter 70, the size of a patch 300 has to be 4 mm+$\alpha$ in the sheet width direction.

Since colorimetric measurement is performed within a limited range of viewing angle in this manner, the spectral colorimeter 70 can generate the color information with higher accuracy than the image scanner 60. Because of this, when a sheet P is passed only once through the conveying route, only one array of patches 300 can be colorimetrically measured.

The spectral colorimeter 70 performs colorimetry of the patches 300 in synchronization with operation of conveying and passing a sheet P through a colorimetry position. Specifically, the spectral colorimeter 70 performs colorimetry of the patches 300 in response to a timing signal which is supplied from the outside.

The colorimetric result of the patches 300 is generated as numeric data, i.e., colorimetric values, represented in a predetermined color model such as Lab color space or XYZ color space, and output to the control unit 100 or the control unit 200.

Sheets P for image adjustment can be saved as many patches 300 are formed in the proceeding direction of a sheet P, i.e., the conveying direction of a sheet P. For example, in the case of an A3 sheet having a length of 420 mm, if the size of a patch 300 is about 20 mm, about 20 patches can be formed on the sheet P in the proceeding direction of a sheet P.

In this case, while conveying the patches 300 of 20 mm size on a sheet P at a predetermined conveying speed, colorimetry is performed. For example, in the case where a sheet P is conveyed at a conveying speed of 200 mm/s and the size of a patch 300 is about 20 mm, colorimetry operation has to be finished within 0.1 second. Nevertheless, actually, the size of a patch 300 is determined by adding a predetermined margin to the length which is determined from the conveying speed and the time required for surely performing colorimetry.

The control unit 200 controls the operation of the image reading apparatus 2. The control unit 200 is implemented with a microcomputer which consists mainly of a CPU, a ROM, a RAM, and an I/O interface. The control unit 200 controls the image detecting operation and the image processing operation of the image reading apparatus 2. The control unit 200 may control various operations in cooperation with the image forming apparatus 1.

Incidentally, as illustrated in FIG. 1, the image forming apparatus 1 is located in the upstream side of the image reading apparatus 2. The image reading apparatus 2 is configured to operate as either an in-line system or an offline system.

The in-line system provides a configuration in which the image reading apparatus 2 is directly fed with a sheet P which is discharged from the image forming apparatus 1 and on which an image is formed. On the other hand, the offline system provides a configuration in which the image reading apparatus 2 is not directly fed with a sheet P which is discharged from the image forming apparatus 1 and on which an image is formed, but the image forming apparatus 1 and the image reading apparatus 2 are designed independently from each other. The following explanation is based on the assumption that an in-line system is used. However, an offline system can be used instead.

Figure 2:
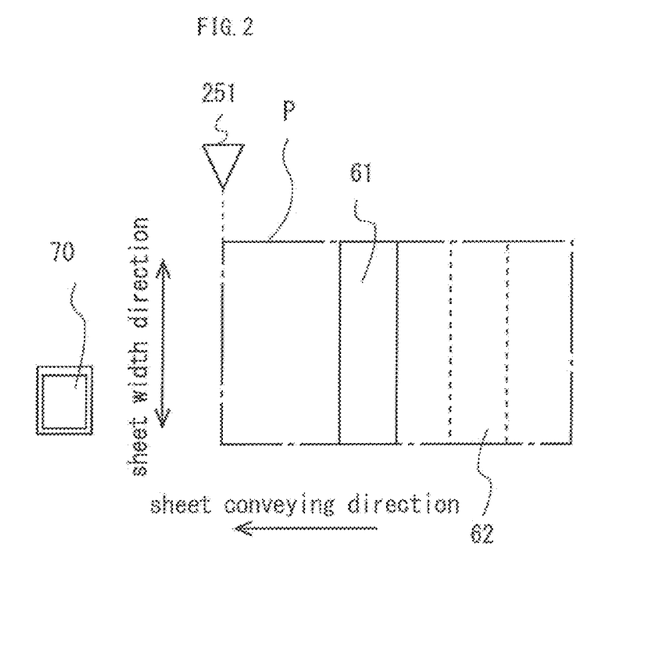
FIG. 2 is a view for schematically explaining the positional relationship between a spectral colorimeter 70 and a sheet P.

FIG. 2 is a view for schematically explaining the positional relationship between the spectral colorimeter 70 and a sheet P. Various controls of the spectral colorimeter 70 are performed by the control unit 100 or the control unit 200. For example, motion control of the spectral colorimeter 70 may be performed. On the other hand, when a sheet P is conveyed in the conveying direction, the leading edge of the sheet P is detected in the upstream side of the spectral colorimeter 70. Specifically, a sheet leading edge detecting sensor 251 is provided between the spectral colorimeter 70 and the image scanner 61. The sheet leading edge detecting sensor 251 serves to detect the leading edge of a sheet P.

Figure 3:
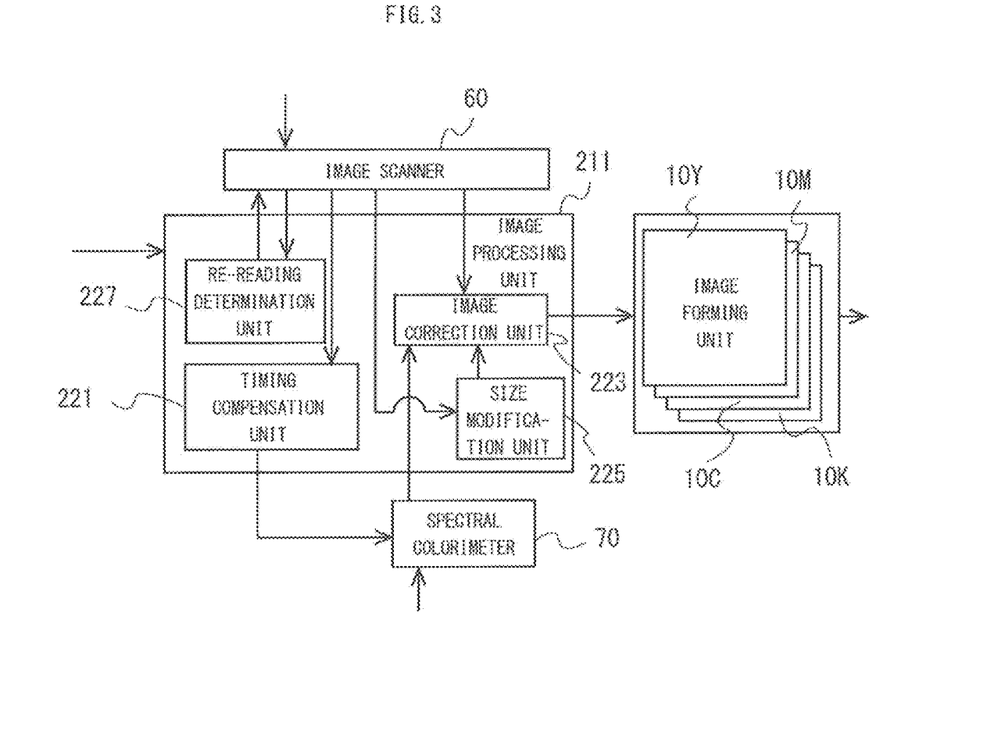
FIG. 3 is a view showing an example of a functional architecture of the image forming system in accordance with the embodiment.

FIG. 3 is a view showing an example of a functional architecture of the image forming system in accordance with the present embodiment. The image processing unit 211 serves to optimize images to be formed by the image forming units 10Y, 10M, 10C and 10K based on the read result of the image scanner 60 and the colorimetric result of the spectral colorimeter 70. The image processing unit 211 is implemented in the control unit 100 or the control unit 200. The image processing unit 211 serves to perform the optimization process of images by comparing the image data read by the image scanner 60 and the image data used by the image forming apparatus 1 to form images. Specifically, the optimization process of images includes adjustment of images to be printed on the front and back sides of a sheet P, adjustment of densities, adjustment of color tones and so forth. Next, the image processing unit 211 will be specifically explained.

The image processing unit 211 is provided with a timing compensation unit 221 and an image correction unit 223. The timing compensation unit 221 compensates a colorimetric measurement timing with which colorimetric operation of the spectral colorimeter 70 is triggered based on the positional information of the patches 300 read by the image scanner 60. The timing compensation unit 221 obtains the intervals of the patches 300 read by the image scanner 60 based on the positional information of the patches 300 read by the image scanner 60. The timing compensation unit 221 obtains the intervals of the patches 300 based on the front end position of the patches 300 and the rear end position of the patches.

In this case, the patches 300 are printed on a plurality of sheets P which are successively conveyed one after another. The densities of the patches 300 printed on a first sheet P1 of the plurality of sheets P are equivalent respectively to the densities of the patches 300 printed on a second sheet P2 which is subsequently conveyed after the first sheet P1.

The timing compensation unit 221 is used to compensate the colorimetric measurement timing of the first sheet P1 or the colorimetric measurement timing of the second sheet P2. Specifically, the timing compensation unit 221 is used to compensate the colorimetric measurement timing of the first sheet P1 based on the positional information of the patches 300 of the first sheet P1 or compensate the colorimetric measurement timing of the second sheet P2 based on the positional information of the patches 300 of the first sheet P1.

The image correction unit 223 corrects the color information of the patches 300 read by the image scanner 60 based on the colorimetric values of the patches 300 colorimetrically measured by the spectral colorimeter 70. The image correction unit 223 associates the colorimetric values of the patches 300 colorimetrically measured by the spectral colorimeter 70 with the color information of the patches 300 read by the image scanner 60.

When the timing compensation unit 221 compensates the colorimetric measurement timing of the second sheet P2 based on the positional information of the patches 300 of the first sheet P1, the image correction unit 223 corrects the color information of the patches 300 of the second sheet P2 based on the colorimetric values of the patches 300 of the second sheet P2.

The image processing unit 211 is provided with a size modification unit 225 and a re-reading determination unit 227. The size modification unit 225 serves to modify the size of the patches 300. Specifically, the size modification unit 225 is provided to modify the size of the patches 300 of the first sheet P1 to a second size which is larger than a predetermined first size, and set the size of the patches 300 of the second sheet P2 to the first size. When the size modification unit 225 modifies and sets the sizes in this manner, the colorimetric measurement timing of the second sheet P2 is compensated.

The re-reading determination unit 227 determines whether to have the image scanner 60 read the same image again. In particular, when the size of the patches 300 of the first sheet P1 is the first size which is predetermined and the colorimetric values of the patches 300 are not included in a predetermined range, the re-reading determination unit 227 determines that the image scanner 60 is to read the patches 300 of the first sheet P1 again, and the colorimetric measurement timing of the second sheet P2 is compensated.

In other words, the image forming system is provided with the image reading apparatus 2 and the image forming apparatus 1 located in the upstream side of the image reading apparatus 2 to form the patches 300, and thereby can consistently perform processes from the image formation to the image optimization. Next, the operation of the image forming system will be specifically explained with reference to FIGS. 4 to 6.

Figure 4:
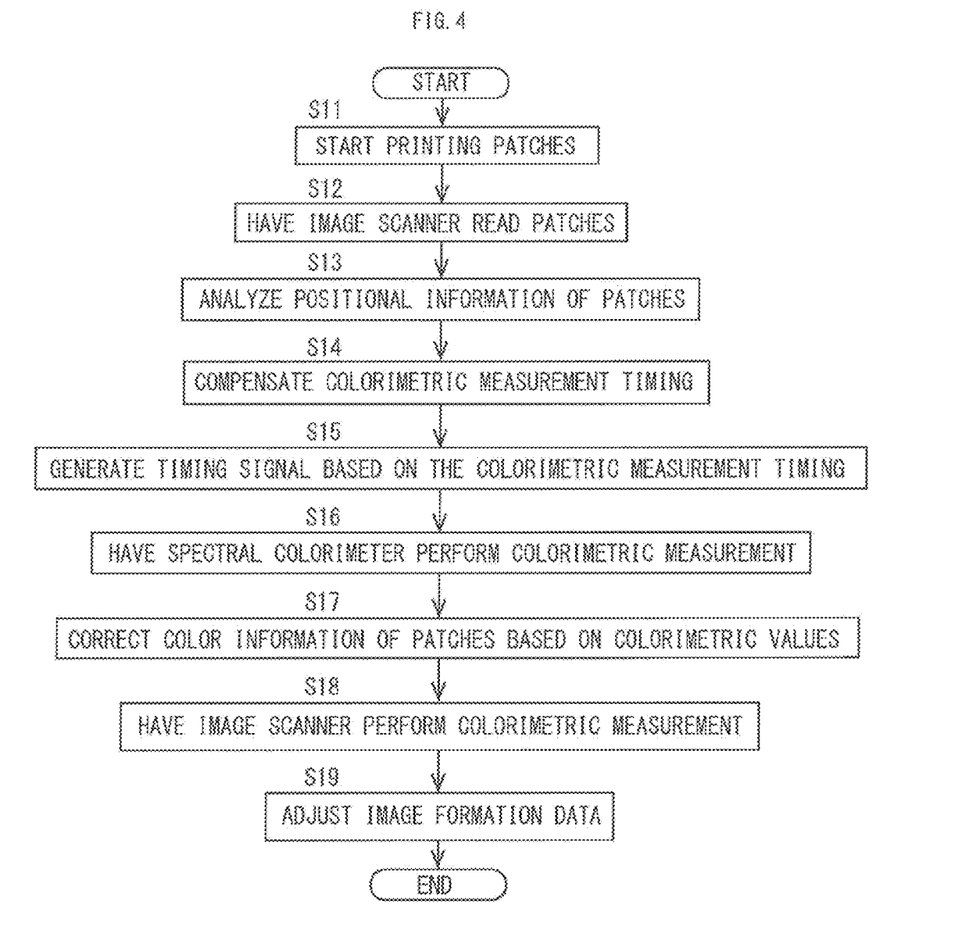
FIG. 4 is a flow chart for showing an example of the operation of the image forming system.

FIG. 4 is a flow chart for showing an example of the operation of the image forming system.

The image forming apparatus 1 starts printing the patches 300 (step S11). The image scanner 60 of the image reading apparatus 2 reads the patches 300 (step S12). The timing compensation unit 221 analyzes the positional information of the patches 300 (step S13), and compensates the colorimetric measurement timing (step S14).

Figure 5:
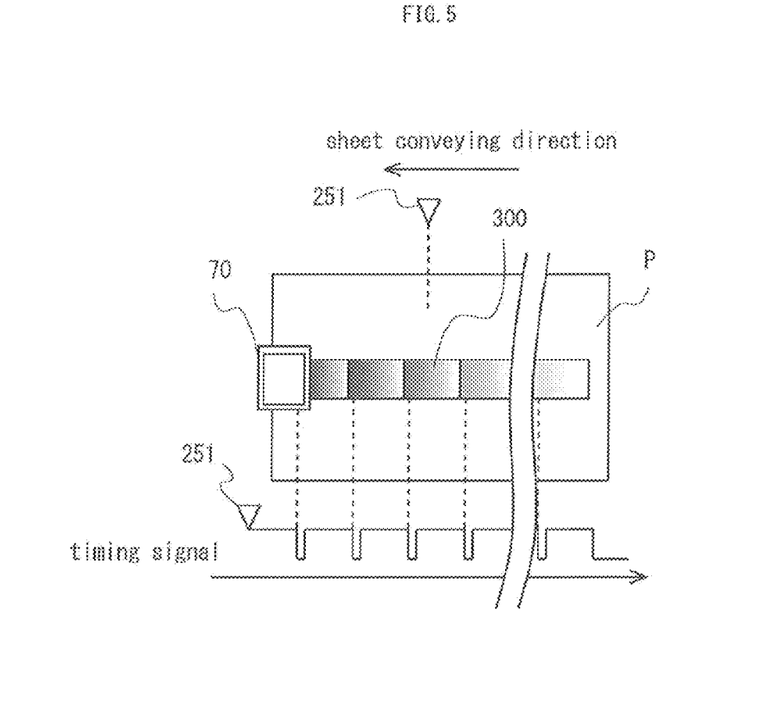
FIG. 5 is a view for explaining a timing signal of the spectral colorimeter 70.

The colorimetric measurement timing will be specifically explained with reference to FIG. 5. FIG. 5 is a view for explaining a timing signal of the spectral colorimeter 70. The front and rear end positions of the patches 300 on a sheet P are identified with reference to the reading result of the image scanner 60. The leading edge of the sheet P is identified by the sheet leading edge detecting sensor 251. Accordingly, the magnification displacement can be obtained based on the distance between the leading edge of the sheet P and the front end position of the patches 300 and the distance between the leading edge of the sheet P and the rear end position of the patches 300. The timing signal is then corrected based on the leading edge of the sheet P, the front end position of the patches 300 and the magnification displacement by correcting a time point to start colorimetric operation of the spectral colorimeter 70 when the front end of the patches 300 is reached after detecting the leading edge of the sheet P. In this case, the timing signal is repeatedly generated in correspondence with the number of the patches 300 printed on one sheet P.

Meanwhile, the patches 300 are evenly spaced on a sheet P. It is considered that, when the patches 300 are printed by the image forming apparatus 1, displacement in printing and the timing signal may occur due to printing precision, resulting in displacement in the intervals between the patches 300 due to displacement in the front end of the patches 300 and the magnification displacement of the patches 300. Accordingly, if the front end of the patches 300 and the magnification displacement of the patches 300 are determined, and the leading edge of the sheet P is detected by the sheet leading edge detecting sensor 251, the timing signal can be generated in correspondence with the displacement in the intervals between the patches 300 to compensate the colorimetric measurement timing.

Even if the positions of the patches 300 are displaced from normal positions due to printing displacement, it is therefore possible to output the timing signal in appropriate positions with respect to the patches 300. The colorimetric measurement timing is thereby compensated based on the positional information of the patches 300 read by the image scanner 60, and therefore the spectral colorimeter 70 need not determine the boundaries between the patches 300. In order to have the spectral colorimeter 70 perform the colorimetric operation by detecting the boundaries between the patches 300, the color differences of the patches 300 have to increase. In this case, a freedom of chart arrangement of the patches 300 is deteriorated. Also, a substantial time is required to detect the boundaries between the patches 300 so that the size of the patches 300 eventually has to be increased.

Furthermore, for the purpose of reducing the influence of the positional displacement of the front end of the patches 300 of a sheet P and the influence of magnification displacement, a technique is known to form timing patches such as black stripes beside the patches 300 and generate the timing signal by the use of another detection sensor such as an analog reflection sensor for detecting the black stripes. In the case of this technique, the detection sensor has to be a reflection sensor of a small spot diameter. The production cost is thereby increased by such a third sensor which is not directly related to the colorimetric measurement.

Accordingly, the spectral colorimeter 70 has only to perform the colorimetric operation by the use of the external timing signal generated with reference to the positional information of the patches 300 read by the image scanner 60, and therefore it is possible to minimize the patches 300 and accurately perform the colorimetric operation at a low cost. Sheets P for image adjustment can thereby be saved to effectively utilize the image scanner 60.

Referring again to FIG. 4, the timing compensation unit 221 generates the timing signal based on the colorimetric measurement timing (step S15), and the spectral colorimeter 70 performs the colorimetric measurement of the patches 300 in synchronization with the timing signal which is compensated (step S16).

In what follows, the patches 300 printed on a sheet P will be specifically explained. The patches 300 are printed with the color components of the image forming apparatus 1 by superimposing all the chromatic colors in constant proportions while the density of each chromatic color is changed in steps. For example, in the case where the color components of the printer are C (cyan), M (magenta), Y (yellow) and K (black), the patch 300 is formed of chromatic colors, i.e., C (cyan), M (magenta) and Y (yellow), except K (black), as combined by varying the densities thereof from 0% to 100% respectively.

Next, the image correction unit 223 corrects the color information of the patches 300 based on the colorimetric values of the patches 300 (step S17). Specifically, since the image scanner 60 and the spectral colorimeter 70 detect the same patch 300, the RGB data as the reading result of the image scanner 60 can be associated with the Lab data as the colorimetric values of the spectral colorimeter 70. The RGB data can be corrected into Lab data with reference to the association between the RGB data and the Lab data. The RGB data is obtained by reading the image printed on a sheet P over the entire surface of the sheet P with the image scanner 60. It is therefore possible to perform colorimetric measurement with the image scanner 60 over the entire surface of the sheet P by correcting RGB data into Lab data.

That is, colorimetric measurement becomes possible over the entire surface of the sheet P with the image scanner 60 with reference to the association between the color information of the patches 300 read by the image scanner 60 and the colorimetric values of the patches 300 measured by the spectral colorimeter 70. Accordingly, even in the case where the patches 300 are formed over the entire surface of the sheet P, the image scanner 60 can be used to perform colorimetric measurement so that sheets P for image adjustment can be saved.

Next, the image scanner 60 performs colorimetric measurement (step S18), and the image formation data is adjusted (step S19). Specifically, the adjustment of the image formation data is an optimization process of images by performing the front and back position adjustment, density adjustment, color tone adjustment of images printed on a sheet P and so forth.

Figure 6:
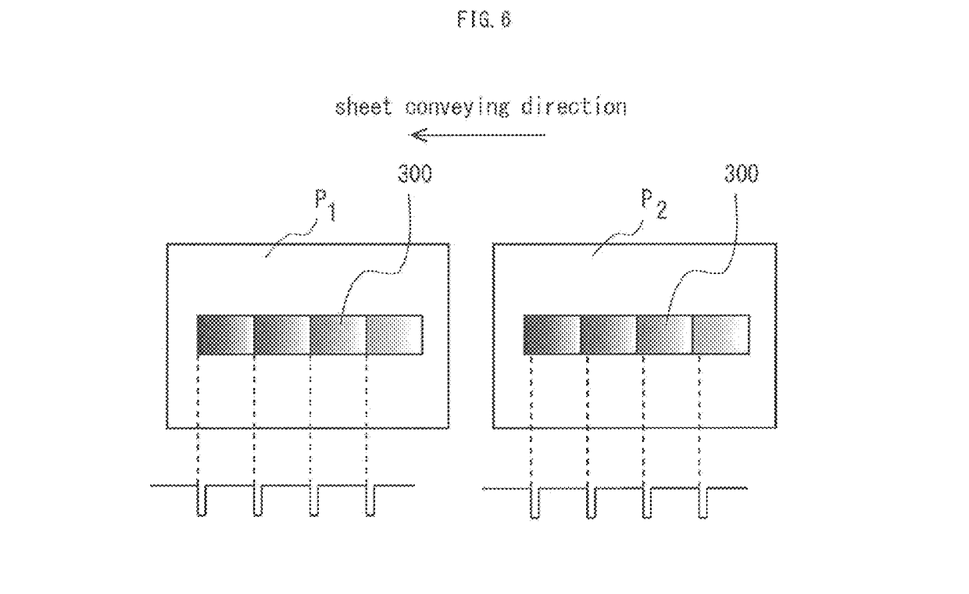
FIG. 6 is a view for showing the timing signal before a colorimetric measurement timing is compensated and the timing signal after the colorimetric measurement timing is compensated.

FIG. 6 is a view for showing the timing signal before the colorimetric measurement timing is compensated and the timing signal after the colorimetric measurement timing is compensated. There may occur the case that the time for compensating the colorimetric measurement timing for the same sheet P becomes insufficient depending on the distance between the image scanner 60 and the spectral colorimeter 70 and the conveying speed of the sheet P. In this case, the colorimetric measurement is not compensated for the first sheet P1, but is compensated for the second sheet P2 which is subsequently conveyed after the first sheet P1. Meanwhile, the patches 300 shown in FIG. 6 is only for the purpose of explaining that the patches 300 are printed on the sheets P1 and P2, and the following description is not reflected in FIG. 6 with respect to the sizes thereof.

Specifically, the patches 300 printed on the first sheet P1 have a size which is sufficiently larger than the size of standard patches 300. Even if printing displacement of the patches 300 occurs, thereby, it is avoided to cross over across the patches 300. The positional displacement of the front end of the patches 300 and the magnification displacement can be acquired by conveying and reading the first sheet P1 with the image scanner 60. Then, for the second sheet P2 which is subsequently conveyed after the first sheet P1 and on which the patches 300 of the standard size are printed, the timing signal is corrected to compensate the colorimetric Measurement timing. Accordingly, even if the patches 300 printed on the second sheet P2 have the relatively small standard size, the colorimetric measurement can be performed in appropriate positions.

Alternatively, the patches 300 of the relatively small standard size can be printed on the first sheet P1, and a standard timing signal can, be given. In this case, the printing displacement can be acquired with the image scanner 60. If the timing signal is suitable, the colorimetric values can be processed as valid values. Conversely, if the timing signal is not suitable, the colorimetric values are discarded, and the colorimetric operation of the patches 300 of the first sheet P1 is performed later again after the timing signal is corrected for the subsequent sheets including the second sheet P2.

If the timing signal is not suitable, for example, the spectral colorimeter 70 colorimetrically measures the boundary between the patches 300. In such a case, the colorimetric values of the patches 300 are not included within a predetermined range. The colorimetric measurement timing is thereby compensated in order that the spectral colorimeter 70 colorimetrically measures the middle of each patch 300. The spectral colorimeter 70 is thereby capable of colorimetrically measure the color tones of the patches 300 in an accurate manner.

As has been discussed above, the image reading apparatus 2 compensates a colorimetric measurement timing, with which colorimetric operation of the spectral colorimeter 70 is triggered, based on the positional information of the patches 300 read by the image scanner 60. Specifically, the trigger timing of the timing signal of the spectral colorimeter 70 is compensated in accordance with the positions of the patches actually printed on a sheet P. The image reading apparatus 2 can thereby reduce the influence of magnification error and detects the patches 300 in correct positions.

Also, the image reading apparatus 2 corrects the color information of the patches 300 read by the image scanner 60 based on the colorimetric values of the patches 300 colorimetrically measured by the spectral colorimeter 70. Specifically, since the image scanner 60 can read the patches 300 over the entire surface of a sheet P, it means that the image scanner 60 can colorimetrically measure the patches 300 over the entire surface of the sheet P by correcting the color information of the patches 300 read by the image scanner 60 based on the colorimetric values of the patches 300 colorimetrically measured by the spectral colorimeter 70. The image reading apparatus 2 can thereby save sheets P for image adjustment.

In other words, the colorimetric measurement timing is compensated in accordance with the positions of the patches actually printed, and the image scanner 60 can colorimetrically measure over the entire surface of a sheet P by compensating the colorimetric measurement timing of the spectral colorimeter 70 based on the read result of the image scanner 60 and correcting the read result of the image scanner 60 based on the colorimetric result of the spectral colorimeter 70. It is therefore possible to reduce the influence of magnification error, detect patches 300 in correct positions, and save the sheets required for adjusting an image.

Also, since the spectral colorimeter 70 is located in the downstream side of the image scanner 60, the same sheet P is conveyed from the image scanner 60 to the spectral colorimeter 70, and the colorimetric measurement timing of the spectral colorimeter 70 can be compensated based on the read result of the image scanner 60.

It is therefore possible to make effective use of the image scanner 60 which is suitable for reading the entirety of a sheet P and the spectral colorimeter 70 which is suitable for colorimetrically measuring the patches 300 in an accurate manner.

Furthermore, since the intervals of the patches 300 read by the image scanner 60 are obtained based on the positional information of the patches 300 read by the image scanner 60, the colorimetric measurement timing considering printing error can be generated based on the positions of the patches actually printed on a sheet P. The colorimetric measurement timing of the spectral colorimeter 70 can thereby be obtained by taking into consideration the influence of magnification error of a sheet P, particularly, in the conveying direction of the sheet P, i.e., the subscanning direction of the sheet P.

Also, the colorimetric values of the patches 300 colorimetrically measured by the spectral colorimeter 70 are associated with the color information of the patches 300 read by the image scanner 60. Specifically, colorimetric values based on Lab color space are associated with color information based on RGB color model. The color information based on RGB color model can thereby be correct to the colorimetric values based on Lab color space. The image scanner 60 can thereby perform colorimetric measurement over the entire surface of a sheet P.

Also, since the intervals of the patches 300 are obtained based on the front end position of the patches 300 and the rear end position of the patches, it is possible to accurately obtain the positional displacement of the patches 300 caused by the magnification displacement of the patches 300 on a sheet P. It is therefore possible to accurately obtain the magnification error of the sheet P.

Furthermore, the patches 300 are printed on a plurality of sheets P which are successively conveyed one after another. The densities of the patches 300 printed on a first sheet P of the plurality of sheets P are equivalent respectively to the densities of the patches 300 printed on a second sheet P which is subsequently conveyed after the first sheet P.

Still further, when the colorimetric measurement timing of the first sheet P is compensated, the color information of the patches 300 of the first sheet P can be corrected. Still further, when the colorimetric measurement timing of the second sheet P is compensated, the color information of the patches 300 of the second sheet P can be corrected. Thereby, since image adjustment can be performed just after compensation of the colorimetric measurement timing, sheets P for image adjustment can be saved.

Also, in the case where the size of the patches 300 of the first sheet P is modified to a second size which is larger than a predetermined first size, and the size of the patches 300 of the second sheet P is set to the first size, the patches larger than the predetermined size are printed on the first sheet P, for example, the earliest sheet P, and the patches having the predetermined size are printed on the second sheet P, for example, a subsequent sheet P. It is therefore possible to save the number of sheets P required for adjusting an image.

Furthermore, when the size of the patches 300 of the first sheet P is the first size which is predetermined and the colorimetric values of the patches 300 are not included in a predetermined range, the image scanner 60 reads the patches 300 of the first sheet P again in order to acquire the positional information of the patches 300 again. Namely, when the colorimetric values of the patches 300 are not appropriate, the colorimetric measurement timing is compensated again.

Also, since the colorimetric measurement timing of the second sheet P is compensated based on the positional information of the patches 300 of the first sheet P, and the color information of the patches 300 of the second sheet P is corrected based on the colorimetric values of the patches 300 of the second sheet P, it is possible to make effectively use of the second sheet P, i.e., the subsequent sheet P. The number of sheets P to be discarded can thereby be reduced.

Furthermore, with the image reading apparatus 2 and the image forming apparatus 1 located in the upstream side of the image reading apparatus 2, the patches 300 can be printed and then optimized on a sheet P. It is therefore possible to consistently perform processes from the image formation to the image optimization. Particularly, it is possible to reduce the influence of magnification error, detect patches 300 in correct positions, and save the sheets required for adjusting an image.

As has been discussed above, the image reading apparatus 2 of the present embodiment makes use of the image scanner 60 which reads the patches 300 printed on a sheet P, and the spectral colorimeter 70 which colorimetrically measures the patches 300 read by the image scanner 60, and is provided with the timing compensation unit 221 which compensates the colorimetric measurement timing with which colorimetric operation of the spectral colorimeter 70 is triggered based on the positional information of the patches 300 read by the image scanner 60, and the image correction unit 223 which corrects the color information of the patches 300 read by the image scanner 60 based on the colorimetric values of the patches 300 colorimetrically measured by the spectral colorimeter 70. It is therefore possible to reduce the influence of magnification error, detect patches 300 in correct positions, and save the sheets P required for adjusting an image.

Incidentally, the spectral colorimeter 70 is located in the downstream side of the image scanner 60. It is therefore possible to make effective use of the image scanner 60 which is suitable for reading the entirety of a sheet P and the spectral colorimeter 70 which is suitable for colorimetrically measuring the patches 300 in an accurate manner.

Also, while plural patches 300 are printed to be read by the image scanner 60, the timing compensation unit 221 obtains the intervals between the patches 300 read by the image scanner 60 based on the positional information of the patches 300 read by the image scanner 60. The colorimetric measurement timing of the spectral colorimeter 70 can thereby be obtained by taking into consideration the influence of magnification error of a sheet P, particularly, in the conveying direction of the sheet P, i.e., the subscanning direction of the sheet P.

On the other hand, the image correction unit 223 associates the colorimetric values of the patches 300 colorimetrically measured by the spectral colorimeter 70 with the color information of the patches 300 read by the image scanner 60. The image scanner 60 can thereby perform colorimetric measurement over the entire surface of a sheet P.

Also, the timing compensation unit 221 obtains the intervals of the patches 300 based on the front end position of the patches 300 and the rear end position of the patches. It is therefore possible to accurately obtain the magnification error of the sheet P.

Furthermore, the patches 300 are printed on a plurality of sheets P which are successively conveyed one after another. The densities of the patches 300 printed on a first sheet P1 of the plurality of sheets P are equivalent respectively to the densities of the patches 300 printed on a second sheet P2 which is subsequently conveyed after the first sheet P1. The timing compensation unit 221 is used to compensate the colorimetric measurement timing of the first sheet P1 or the colorimetric measurement timing of the second sheet P2. Thereby, since image adjustment can be performed just after compensation of the colorimetric measurement timing, sheets P for image adjustment can be saved.

Still further, the size modification unit 225 is provided to modify the size of the patches 300. When the size modification unit 225 modifies the size of the patches of the first sheet P1 to a second size which is larger than a predetermined first size, and sets the size of the patches 300 of the second sheet P2 to the first size, the colorimetric measurement timing of the second sheet P2 is compensated. It is therefore possible to save the number of sheets P required for adjusting an image.

Meanwhile, in the case where the image processing unit 211 is provided in the control unit 100, the size modification unit 225 transmits control signals to the image forming units 10Y, 10M, 10C and 10K. Alternatively, in the case where the image processing unit 211 is provided in the control unit 200, the size modification unit 225 transmits control signals to the control unit 100 which then transmits control signals the image forming units 10Y, 10M, 10C and 10K.

Also, the re-reading determination unit 227 is further provided to determine whether to have the image scanner 60 read the same image again. When the size of the patches 300 of the first sheet P1 is the first size which is predetermined and the colorimetric values of the patches 300 are not included in a predetermined range, the re-reading determination unit 227 determines that the image scanner 60 is to read the patches 300 of the first sheet P1 again, and the colorimetric measurement timing of the second sheet P2 is compensated. Hence, when the colorimetric values of the patches 300 are not appropriate, the colorimetric measurement timing is compensated again.

The timing compensation unit 221 compensates the colorimetric measurement timing of the second sheet P2 based on the positional information of the patches 300 of the first sheet P1. The image correction unit 223 corrects the color information of the patches 300 of the second sheet P2 based on the colorimetric values of the patches 300 of the second sheet P2. The number of sheets P to be discarded can thereby be reduced.

Also, the image forming system is provided with the image reading apparatus 2 and the image forming apparatus 1 located in the upstream side of the image reading apparatus 2 to form the patches 300. It is therefore possible to consistently perform processes from the image formation to the image optimization. Particularly, it is possible to reduce the influence of magnification error, detect patches 300 in correct positions, and save the sheets required for adjusting an image.

The image processing apparatus have been explained based on the embodiments in accordance with the present invention. However, it is not intended to limit the present invention to the precise form described, and obviously many modifications and variations are possible without departing from the scope of the invention.

For example, while the image processing unit 211 is implemented within the image reading apparatus 2 in the above example, the present invention is not limited to this structure but the image processing unit 211 can be implemented within the image forming apparatus 1.

Also, while an in-line system is used in the image reading apparatus 2 of the present embodiment, the present invention is not limited thereto but can be applied to an offline system.

Furthermore, while the image scanners 61 and 62 are provided in the above example, the present invention is not limited to this structure but only either one of the image scanner 61 and the image scanner 62 may be provided. Meanwhile, in the case where only either one of the image scanner 61 and the image scanner 62 is provided, there is provided a conveying route on which a sheet P is reversed and circulated.

Also, while the imaging device consists of CCDs in the above example, the present invention is not limited to this structure but the imaging device may consist of CMOSs.

Furthermore, while the above example have been described with the first sheet P1 and the second sheet P2, the present invention is not limited to this structure but the eleventh sheet and the twelfth sheet may be used in place of the first sheet P1 and the second sheet P2 respectively. Namely, the above description can be applied generally to the case where, of sheets P sequentially conveyed, a preceding one of any adjacent sheets is read by the image scanner 60 and the subsequent sheet is colorimetrically measured by the spectral colorimeter 70.

What is claimed is:

1. An image reading apparatus utilizing (i) an image scanner configured to read a plurality of patches printed on a sheet and (ii) a spectral colorimeter configured to colorimetrically measure the plurality of patches which were provided to the image scanner at a downstream end of the image scanner in a sheet conveying direction and which were read by the image scanner, said image reading apparatus comprising a hardware processor configured to:
    obtain a leading edge position of the sheet using a sheet detection sensor;
    obtain positional information of the plurality of patches read by the image scanner, the positional information including positional information of a front end and a rear end of the plurality of patches in the sheet conveying direction;
    based on a distance from the leading edge position of the sheet to the front end of the plurality of patches, and on a distance from the leading edge position of the sheet to the rear end of the plurality of patches, compute a magnification displacement of the plurality of patches in the sheet conveying direction;
    compensate a colorimetric measurement timing with which colorimetric operation of the spectral colorimeter is triggered based on the magnification displacement, the positional information of the plurality of patches read by the image scanner, and the leading edge position obtained using the sheet detection sensor; and
    correct color information of the plurality of patches read by the image scanner based on the colorimetric values of the plurality of patches colorimetrically measured by the spectral colorimeter.

2. The image reading apparatus of claim 1 wherein the spectral colorimeter is located in the downstream side of the image scanner.

3. The image reading apparatus of claim 1 wherein the hardware processor is configured to obtain intervals of the patches read by the image scanner based on the positional information of the patches read by the image scanner.

4. The image reading apparatus of claim 3 wherein the hardware processor is configured to associate the colorimetric values of the patches colorimetrically measured by the spectral colorimeter with the color information of the patches read by the image scanner.

5. The image reading apparatus of claim 3 wherein the hardware processor is configured to obtain intervals of the patches based on respective front end and rear end positions of the patches.

6. An image reading apparatus utilizing an image scanner which reads a patch printed on a sheet and a spectral colorimeter which colorimetrically measures the patch read by the image scanner, said image reading apparatus comprising a hardware processor configured to:
    compensate a colorimetric measurement timing with which colorimetric operation of the spectral colorimeter is triggered based on positional information of the patch read by the image scanner; and
    correct color information of the patches read by the image scanner based on the colorimetric values of the patches colorimetrically measured by the spectral colorimeter,
    wherein the patch is printed on a plurality of sheets which are successively conveyed one after another, and the density of the patch printed on a first sheet of the plurality of sheets is equivalent to the density of the patch printed on a second sheet which is subsequently conveyed after the first sheet, and
    wherein the hardware processor is configured to compensate the colorimetric measurement timing of the first sheet or the colorimetric measurement timing of the second sheet.

7. The image reading apparatus of claim 6, wherein the hardware processor is further configured to:
    modify the size of the patch, wherein
    when the hardware processor modifies the size of the patch of the first sheet to a second size which is larger than a predetermined first size, and sets the size of the patch of the second sheet to the first size, the colorimetric measurement timing of the second sheet is compensated.

8. The image reading apparatus of claim 6, wherein the hardware processor is further configured to:
    determine whether to have the image scanner read the same image again, wherein
    when the size of the patch of the first sheet is a predetermined first size and a colorimetric value of the patch is not included in a predetermined range, the hardware processor determines that the image scanner is to read the patch of the first sheet again, and the colorimetric measurement timing of the second sheet is compensated.

9. The image reading apparatus of claim 6 wherein:
the hardware processor is configured to compensate the colorimetric measurement timing of the second sheet based on the positional information of the patch of the first sheet, and wherein
the hardware process is configured to correct the color information of the patch of the second sheet based on the colorimetric values of the patch of the second sheet.

10. An image forming system comprising:
an image reading apparatus as recited in claim 1;
an image forming apparatus located in the upstream side of the image reading apparatus and configured to form the plurality of patches.

11. An image forming system comprising:
an image reading apparatus as recited in claim 6;
an image forming apparatus located in the upstream side of the image reading apparatus and configured to form the patch.

12. The image reading apparatus of claim 1 wherein:
the hardware processor is configured to obtain intervals of the patches based on the rear end of the patches and based on the leading edge position of the sheet.

13. The image reading apparatus of claim 1 wherein:
wherein the patches are printed on a plurality of sheets which are successively conveyed one after another, and the density of the patches printed on a first sheet of the plurality of sheets is equivalent to the density of the patches printed on a second sheet which is subsequently conveyed after the first sheet, and
wherein the hardware processor is configured to compensate the colorimetric measurement timing of the first sheet or the colorimetric measurement timing of the second sheet.

14. The image reading apparatus of claim 6, wherein the hardware processor is further configured to:
modify the size of the patches, wherein
when the hardware processor modifies the size of the patches of the first sheet to a second size which is larger than a predetermined first size, and sets the size of the patches of the second sheet to the first size, the colorimetric measurement timing of the second sheet is compensated.

15. The image reading apparatus of claim 1, wherein the hardware processor is further configured to:
determine whether to have the image scanner read the same image again, wherein
when the size of the patches of the first sheet is a predetermined first size and a colorimetric value of the patches is not included in a predetermined range, the hardware processor determines that the image scanner is to read the patches of the first sheet again, and the colorimetric measurement timing of the second sheet is compensated.

16. The image reading apparatus of claim 1 wherein:
the hardware processor is configured to compensate the colorimetric measurement timing of the second sheet based on the positional information of the patches of the first sheet, and wherein
the hardware process is configured to correct the color information of the patches of the second sheet based on the colorimetric values of the patches of the second sheet.

* * * * *